J. MORTON.
NUT-LOCK.

No. 176,335.

Patented April 18, 1876.

Attest:
F. H. Schott
J. Masonbozler

Inventor:
John Morton
By N. Crawford
atty.

UNITED STATES PATENT OFFICE.

JOHN MORTON, OF CINCINNATI, OHIO, ASSIGNOR TO JAMES T. KING, OF EL PASO, ILLINOIS.

IMPROVEMENT IN NUT-LOCKS.

Specification forming part of Letters Patent No. 176,335, dated April 18, 1876; application filed January 21, 1873.

*To all whom it may concern:*

Be it known that I, JOHN MORTON, of Cincinnati, in the county of Hamilton and State of Ohio, have invented a new and useful Improvement in Nut-Locks; and I do hereby declare the following to be a full, clear, and exact description thereof, which will enable others skilled in the art to which it appertains to make and use the same, reference being had to the accompanying drawing, forming part of this specification, in which—

Figure 1:
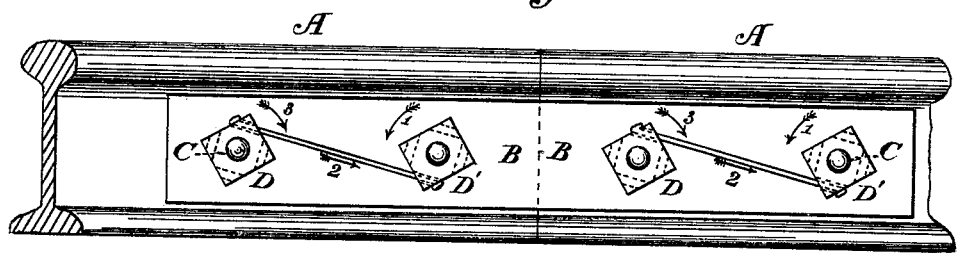
Figure 2:

Figure 1 is a side elevation of a portion of a railway-rail, taking in the joint, with my improved nut-lock attached, showing the manner of securing one nut to the other. Fig. 2 is an elevation of the nuts inverted, showing the face toward the fish-plate, and the manner of connecting the tie-rod to them.

My invention is more especially adapted to secure the nuts used in connecting the joint of railway-rails, but may be used for other purposes where two nuts are arranged in close proximity to each other, and its object is to prevent the nuts from becoming loosened by turning backward on the screw-threads of their respective bolts; and it consists in the use of a diagonal tie or locking rod, that fits into grooves in the face of the nuts adjacent to the fish-plate, and extends from the upper inside corner of one nut to the lower inside corner of its fellow nut, and to which it is locked, and then looping the ends of the tie-rod about the nuts, so that the unscrewing of one is prevented by the tightening of the other, as will be more fully understood by the following description and claims.

In the drawing, A A represent the rails, and B the fish plate. C C represent the bolts which pass through the web of the rail and fish-plate, in the usual manner.

D D' are the nuts, which are screwed on the bolts C C and adjusted to bear against the fish-plate in the ordinary manner. These nuts are each provided on the face adjacent to the fish-plate with a series of grooves or channels, $a$, cut or otherwise formed across the same at or near an angle of forty-five degrees to the edges of the nut, as shown in Fig. 2.

F is a metal tie-rod, adapted to loosely fit in the grooves $a$ in the respective nuts. This tie-rod is made from steel, copper, or soft annealed iron, and is passed through the grooves $a$, extending from the upper corner of the left-hand nut D, diagonally across the central plane of the bolts, to the lower corner of the right-hand nut D', and its ends bent or looped about the edges of the nuts, connecting them firmly together. By this arrangement of the tie-rod and its connection with the nuts, the latter are connected and locked together, so that the unscrewing of one or either of them will tighten the other, and also allow them to be locked in any position they may be in when screwed up tightly.

When the nuts are properly tightened against the plate and the tie-rod adjusted to them, should nut D' tend to unscrew or move back on its bolt, which would be in the direction indicated by arrow 1, it would produce a tensile strain on the tie rod in the direction indicated by arrow 2, tending to move nut D in an opposite direction, as indicated by arrow 3, tightening it on its bolt; or should nut D tend to unscrew, the action would be vice versa; consequently neither one of the nuts can move back or become loosened on its bolt in the slightest.

What I claim is—

In combination with the grooved nuts D D', the tie-rod F, passed through the grooves and looped about the edges of the nuts, and extending from the upper corner of one nut diagonally across the center plane of the bolts to the lower corner of the other nut, to which it is tied, whereby the unscrewing of one nut will tighten the other, as specified.

In testimony of which invention I hereunto set my hand.

JOHN MORTON.

Witnesses:
FRANK MILLWARD,
J. L. WARTMANN.